United States Patent
Chigusa

(10) Patent No.: US 9,342,476 B2
(45) Date of Patent: May 17, 2016

(54) IMAGE PROCESSING APPARATUS, INFORMATION PROCESSING APPARATUS, AND INFORMATION PROCESSING SYSTEM

(75) Inventor: Yoshinari Chigusa, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 534 days.

(21) Appl. No.: 13/017,574

(22) Filed: Jan. 31, 2011

(65) Prior Publication Data
US 2011/0188080 A1    Aug. 4, 2011

(30) Foreign Application Priority Data
Feb. 2, 2010    (JP) .................................. 2010-021596

(51) Int. Cl.
*G06F 15/00* (2006.01)

(52) U.S. Cl.
CPC ....................................... *G06F 15/00* (2013.01)

(58) Field of Classification Search
None
See application file for complete search history.

(56) References Cited

U.S. PATENT DOCUMENTS

| | | | |
|---|---|---|---|
| 6,661,526 B1* | 12/2003 | Daly et al. | 358/1.13 |
| 8,542,400 B2 | 9/2013 | Kadota | |
| 2002/0083431 A1* | 6/2002 | Machida | 717/174 |
| 2003/0090694 A1* | 5/2003 | Kennedy et al. | 358/1.13 |
| 2004/0218201 A1* | 11/2004 | Lermant et al. | 358/1.13 |
| 2006/0061789 A1* | 3/2006 | Yamaoka | G06F 9/4411 358/1.13 |
| 2006/0268306 A1* | 11/2006 | Kojima et al. | 358/1.13 |
| 2008/0172302 A1* | 7/2008 | Knodt | 705/26 |
| 2009/0091781 A1* | 4/2009 | Nishimura | 358/1.15 |
| 2010/0094979 A1* | 4/2010 | Azami | 709/221 |
| 2010/0242054 A1* | 9/2010 | Wu et al. | 719/321 |

FOREIGN PATENT DOCUMENTS

| | | |
|---|---|---|
| JP | A-2002-149363 | 5/2002 |
| JP | A-2002-149372 | 5/2002 |
| JP | 2004-287841 | 10/2004 |
| JP | 2005-63415 | 3/2005 |
| JP | 3703376 | 7/2005 |
| JP | 2006-228128 | 8/2006 |
| JP | 2007-69358 | 3/2007 |
| JP | 2008015794 A * | 1/2008 |

(Continued)

OTHER PUBLICATIONS

English translation of JP2008-015794A.*

(Continued)

*Primary Examiner* — Fan Zhang
(74) *Attorney, Agent, or Firm* — Oblon, McClelland, Maier & Neustadt, L.L.P.

(57) ABSTRACT

An image processing apparatus that outputs images includes: a storage unit that stores therein a printer driver, in which configurations and functions related to image outputs are described in a text format, and device information indicating configurations related to image outputs in the image processing apparatus; a receiving unit that receives, from an information processing apparatus connected via a communication line, a transmission request message that requests transmission of the printer driver; a reflecting unit that reflects the device information on the printer driver when the receiving unit receives the transmission request message; and a transmitting unit that transmits the printer driver, on which the device information is reflected by the reflecting unit, to the information processing apparatus.

18 Claims, 8 Drawing Sheets

(56) References Cited

FOREIGN PATENT DOCUMENTS

| | | |
|---|---|---|
| JP | 2008-123299 | 5/2008 |
| JP | A-2008-165481 | 7/2008 |

OTHER PUBLICATIONS

Office Action issued in corresponding Japanese Patent Application No. 2010-021596 mailed Oct. 1, 2013.

* cited by examiner

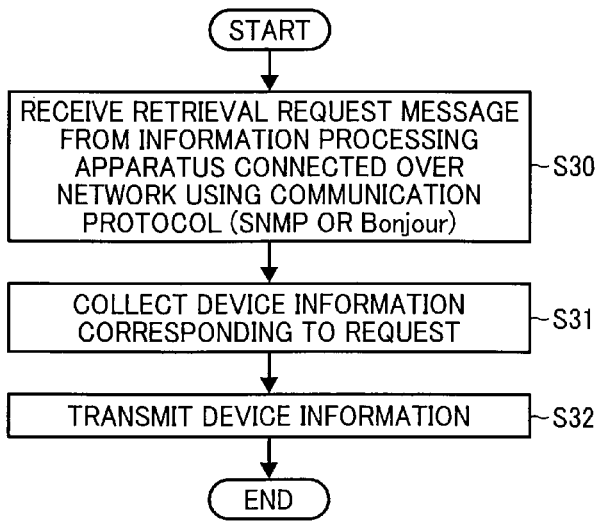
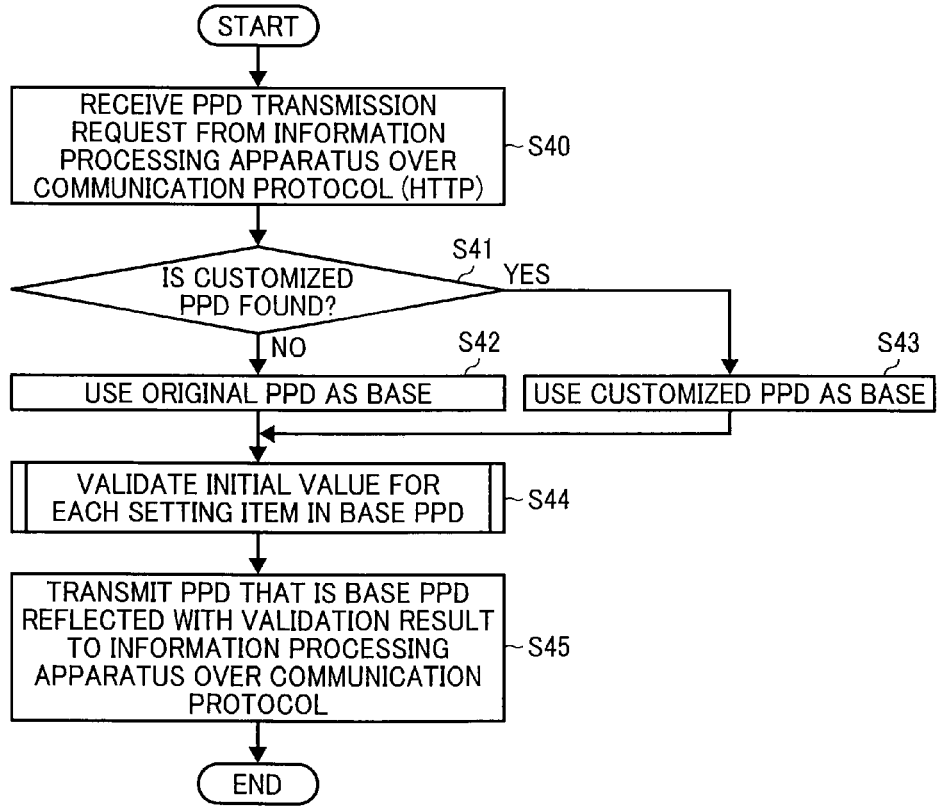

IMAGE PROCESSING APPARATUS, INFORMATION PROCESSING APPARATUS, AND INFORMATION PROCESSING SYSTEM

CROSS-REFERENCE TO RELATED APPLICATIONS

The present application claims priority to and incorporates by reference the entire contents of Japanese Patent Application No. 2010-021596 filed in Japan on Feb. 2, 2010.

BACKGROUND OF THE INVENTION

1. Field of the Invention

The present invention relates to an image processing apparatus, an information processing apparatus, and an information processing system.

2. Description of the Related Art

Conventionally, some information processing apparatuses are installed with Linux (registered trademark), for example, as an operation system (OS). Some of the information processing apparatuses are known to detect an image processing apparatus, which is connected to a network, using Simple Network Management Protocol (SNMP), and to display the image processing apparatus thus detected as a registration candidate printer when registering a printer to which print data for requesting printing of images is transmitted using a function of Common UNIX (registered trademark) Printing System (CUPS). When an image processing apparatus is selected from registration candidate printers, for example, the information processing apparatus retrieves a PostScript Printer Description (PPD) corresponding to the image processing apparatus stored therein, and if the PPD is stored, automatically displays the PPD as default values for the printer being registered. A PPD is a printer driver that describes configurations and functions related to image outputs in a text format, and more specifically, is a text file describing every function made available on a PostScript printer being capable of interpreting a page description language called PostScript. A PPD is usually created by the manufacturer of a printer. On the contrary, if the information processing apparatus stores therein no PPD, the information processing apparatus accesses a Web server over the Internet, retrieves a relevant PPD, and, if the PPD is found, automatically downloads the PPD over Hypertext Transfer Protocol (HTTP), and automatically displays the PPD as default values for the printer being registered.

In such a technology for retrieving and installing a PPD, initial values specified in the PPD are fixed, and such values do not reflect option configuration information about the configuration of options added to the image processing apparatus that is actually to be used, or device information describing the configurations related to image outputs, such as paper information about the paper placed in a paper feed tray. Therefore, in some cases, the user has to make some operations/inputs for the device information on the information processing apparatus after registration of a printer is completed, or the information processing apparatus has to be provided with a mechanism for establishing bidirectional communications with the image processing apparatus to obtain and to set up the device information after the printer is registered. For example, Japanese Patent No. 3703376 discloses an information processing apparatus that obtains paper information. More specifically, when an instruction for obtaining paper information including medium type information indicating the type of paper placed in the paper feed tray of an image processing apparatus is entered, the information processing apparatus issues a request, according to the instruction, for the paper information including the medium type information to the image processing apparatus over a network using a device information obtaining module that is used in a network device management utility for managing the image processing apparatus. In response to the request via the device information obtaining module, the paper information including the medium type information is obtained from the image processing apparatus. The information processing apparatus then uses the paper information when generating print data to be printed by the image processing apparatus via the network.

However, the technology disclosed in Japanese Patent No. 3703376 requires bidirectional communications to obtain the paper information for the image processing apparatus. Therefore, it has been difficult for a printer driver realized as a simple text file such as a PPD to obtain device information such as paper information without establishing bidirectional communications.

SUMMARY OF THE INVENTION

It is an object of the present invention to at least partially solve the problems in the conventional technology.

According to an aspect of the present invention, there is provided an image processing apparatus that outputs images, the image processing apparatus including: a storage unit that stores therein a printer driver, in which configurations and functions related to image outputs are described in a text format, and device information indicating configurations related to image outputs in the image processing apparatus; a receiving unit that receives, from an information processing apparatus connected via a communication line, a transmission request message that requests transmission of the printer driver; a reflecting unit that reflects the device information on the printer driver when the receiving unit receives the transmission request message; and a transmitting unit that transmits the printer driver, on which the device information is reflected by the reflecting unit, to the information processing apparatus.

According to another aspect of the present invention, there is provided an information processing apparatus including: a transmitting unit that transmits a first transmission request message requesting transmission of a printer driver in which configurations and functions related to image outputs performed in an image processing apparatus connected via a communication circuit are described in a text format; a receiving unit that receives the printer driver reflecting device information indicating configurations related to image outputs performed in the image processing apparatus in response to the first transmission request message; and an installing unit that installs the printer driver received by the receiving unit.

According to still another aspect of the present invention, there is provided an information processing system in which an information processing apparatus and an image processing apparatus that outputs images are connected via a communication line, wherein the information processing apparatus includes: a first transmitting unit that transmits a first transmission request message requesting transmission of a printer driver in which configurations and functions related to image outputs performed in the image processing apparatus are described in a text format; a first receiving unit that receives the printer driver reflecting device information indicating configurations related to image outputs performed in the image processing apparatus in response to the first transmission request message; and an installing unit that installs the printer driver received by the first receiving unit, and the image processing apparatus includes: a storage unit that stores therein the printer driver and the device information; a second receiving unit that receives the first transmission request message from the information processing apparatus; a reflecting unit that reflects the device information on the printer driver when the second receiving unit receives the first transmission request message; and a second transmitting unit that transmits the printer driver, on which the device information is reflected by the reflecting unit, to the information processing apparatus.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a flowchart of a process performed when an image processing apparatus receives a retrieval request message from the information processing apparatus at Step S1 in FIG. 3;

FIG. 5 is a flowchart of a process performed when the image processing apparatus receives a transmission request message from the information processing apparatus at Step S5 in FIG. 3;

DETAILED DESCRIPTION OF THE PREFERRED EMBODIMENTS

An exemplary embodiment of an image processing apparatus, an information processing apparatus, an information processing system, an information processing method, and a computer program according to the present invention is described below in greater detail with reference to the accompanying drawings.

Figure 1:
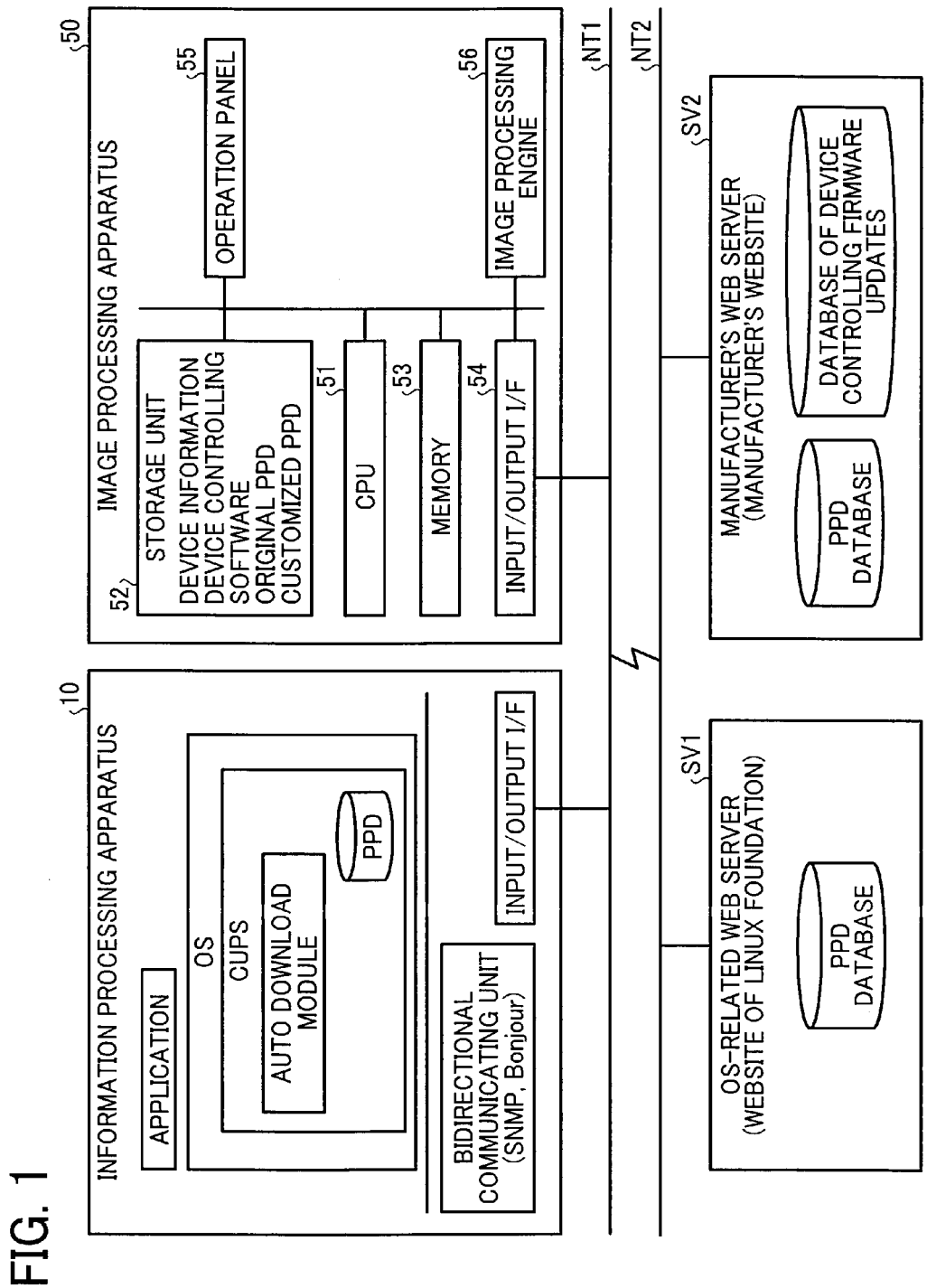
FIG. 1 depicts an exemplary configuration of an information processing system according to an embodiment of the present invention.

A configuration of an information processing system according to an embodiment of the present invention will now be explained with reference to FIG. 1. The information processing system according to the embodiment includes an image processing apparatus 50, an information processing apparatus 10, an OS-related Web server SV1, and a manufacturer's Web server SV2. The image processing apparatus 50 and the information processing apparatus 10 are connected over a network NT1. The network NT1, the manufacturer's Web server SV2, and the OS-related Web server SV1 are connected over a network NT2. The information processing apparatus 10 and the image processing apparatus 50, and the manufacturer's Web server SV2 and the OS-related Web server SV1 are connected over the networks NT1 and NT2. Although the single image processing apparatus 50 is illustrated in FIG. 1, plural image processing apparatuses 50 may be connected to the network NT1. Each of the image processing apparatuses 50 is assigned with a printer identification (ID), for example, for identifying each of the image processing apparatuses 50. Examples of the networks NT1 and NT2 include a local area network (LAN), an intranet, an Ethernet (registered trademark), and the Internet. The networks NT1 and NT2 may be the same network, or different networks. The information processing apparatus 10 uses Linux as an OS, and obtains a PostScript Printer Description (PPD) from the image processing apparatus 50 or the manufacturer's Web server SV2 when registering the image processing apparatus 50 as a printer. When printing is executed after the image processing apparatus 50 is registered as a printer, the information processing apparatus 10 transmits print data giving an instruction for printing an image to the image processing apparatus 50. The image processing apparatus 50 is a printer that executes printing by outputting an image onto a recording medium, such as paper, using the print data received from the information processing apparatus 10. The image processing apparatus 50 stores therein a PPD, and transmits the PPD in response to a request issued by the information processing apparatus 10. The manufacturer's Web server SV2 is a Web site of a printer manufacturer, and has a database storing therein various PPDs each corresponding to a printer manufactured by the manufacturer. The manufacturer's Web server SV2 also stores therein the latest device controlling firmware containing a PPD and updated as required. The device controlling firmware is executed on the image processing apparatus 50, and will be described later in detail. The OS-related Web server SV1 is a Web site exemplified by the Web site of the Linux Foundation, for example, and has a database storing therein various PPDs each corresponding to a printer manufactured by different manufacturers. The manufacturer's Web server SV2 and the OS-related Web server SV1 retrieve a PPD in their databases and transmit the PPD obtained in the retrieval to the information processing apparatus 10 in response to a request issued by the information processing apparatus 10.

A hardware configuration of the information processing apparatus 10 will now be explained. The information processing apparatus 10 according to the embodiment includes a control unit such as a central processing unit (CPU) that controls the entire apparatus, main memories such as a read-only memory (ROM) and a random access memory (RAM) storing therein various types of data and various computer programs, an auxiliary storage such as a hard disk drive (HDD) or a compact disk (CD) drive storing therein various types of data and various computer programs, and a bus connecting these components. The information processing apparatus 10 has a hardware configuration based on an ordinary computer. A PPD is stored in the auxiliary storage in association with a printer ID, for example. In addition, a display unit for displaying information, an operation/input unit such as a keyboard or a mouse for receiving inputs of user instructions, and a communication interface (I/F) for controlling communications with external apparatuses such as the image processing apparatus 50 and the manufacturer's Web server SV2 are connected to the information processing apparatus 10 over some wire or wirelessly.

Figure 2:
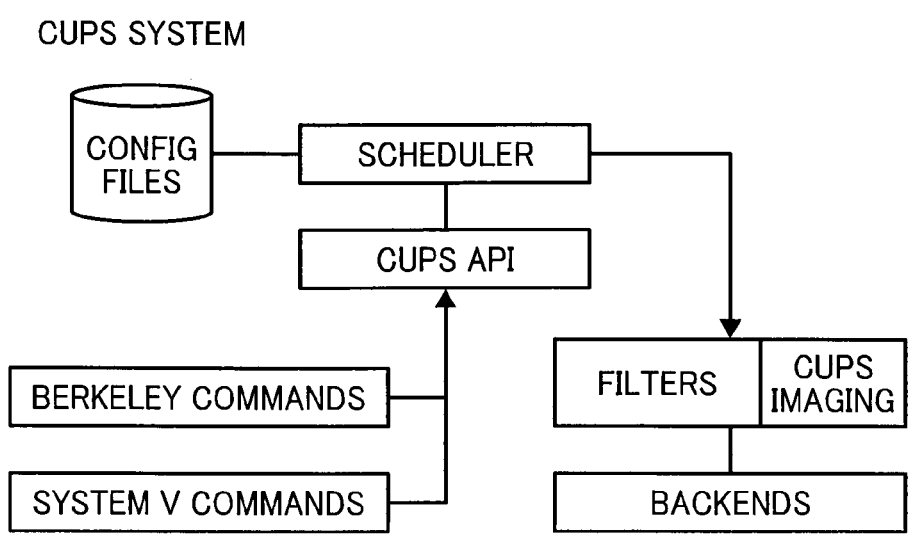
FIG. 2 depicts an exemplary configuration of CUPS.

A software configuration of the information processing apparatus 10 will now be explained. The information processing apparatus 10 includes Linux as an OS, the CUPS as a printing system, various applications, a bidirectional communicating unit for realizing bidirectional communications, and an input/output I/F for controlling inputs and outputs. Each of the computer programs such as the OS or the CUPS is stored in the main memory or the auxiliary storage, and executed by the CPU to realize various functions. Each function of the bidirectional communicating unit and the input/output I/F is realized by the communication I/F and the CPU executing various computer programs. FIG. 2 depicts an exemplary configuration of the CUPS. The CUPS has modules of ConfigFiles, scheduler, Berkeley commands, system V commands, CUPS API, filters, CUPS Imaging, and backends. Because the basic configuration of each of these modules is well-known, an explanation thereof is omitted herein. The CUPS having such a basic configuration retrieves a printer connected to the network NT1 over a communication protocol such as SNMP or the Bonjour, and displays a printer thus discovered in a list format as a candidate printer for registration on the display unit. For example, the printer ID of the printer of the image processing apparatus 50 connected to the network NT1 is displayed as a candidate printer for registration. If a user selects a printer to be registered from candidate printers for registration with the operation input unit, the CUPS retrieves a PPD corresponding to the selected printer from the auxiliary storage. If no PPD is stored in the auxiliary storage, the CUPS downloads the PPD from an external apparatus and stores the PPD in the auxiliary storage. At this time, in the embodiment, the CUPS accesses the printer selected by the user over the network NT1, and downloads the PPD reflecting the device information of the printer and customized as appropriate. The device information will be explained later.

If the PPD cannot be downloaded from the printer to be registered, the CUPS accesses the manufacturer's Web server SV2 over the networks NT1 and NT2, and receives the PPD. In addition, if the CUPS finds the latest device controlling firmware containing the PPD for the printer to be registered upon accessing the manufacturer's Web server SV2, the CUPS receives the firmware as well, transmits the device controlling firmware to the printer to be registered, causes the printer to update the device controlling firmware, and then receives the PPD from the printer. If the CUPS cannot receive the device controlling firmware from the manufacturer's Web server SV2, the CUPS accesses the OS-related Web server SV1 over the network NT1, and receives the relevant PPD. In any of these cases, the CUPS executes an installing process for installing the received PPD, and executes a process for registering the printer to be registered (printer registration process). Because the printer registration process is the same as that performed by a conventional CUPS, a detailed explanation thereof is omitted herein.

A structure of the image processing apparatus 50 will now be explained. The image processing apparatus 50 includes at least one paper feed tray (not illustrated), a CPU 51, a storage unit 52, an operation panel 55, a memory 53, an input/output I/F 54, and an image processing engine 56. The image processing engine 56 is a printer engine for printing an image, such as a monochromatic plotter, a single-drum color plotter, a four-drum color plotter, a scanner, or a facsimile unit. The image processing engine 56 also includes image processing units such as those performing error diffusion or gamma conversion in addition to the so-called engine unit such as a plotter. In addition, various options may be added to the image processing apparatus 50 in addition to the image processing engine. Examples of such options include a duplex option unit for enabling duplex printing, a staple printing unit for enabling stapled printing, and a punching unit for enabling punching. Paper on which an image is to be printed is set in the paper feed tray. A tray number, for example, is assigned to a paper feed tray. The input/output I/F 54 controls communications between the image processing apparatus 50 and external apparatuses such as the information processing apparatus 10. The operation panel 55 is an operation input unit for receiving inputs of user operations, such as operation keys, operation buttons, and a mouse, integrated with a display unit for displaying information, such as a liquid crystal display. The CPU 51 executes various computer programs stored in the memory or the storage unit to control the entire image processing apparatus 50. In particular, the CPU 51 executes device controlling software stored in the storage unit to control the image processing engine, to control the communications performed via the input/output I/F 54, and to control the operation panel 55. Through the communications performed via the input/output I/F 54, the CPU 51 receives print data from the information processing apparatus 10 according to a printing protocol, or reads a PPD requested by the information processing apparatus 10 from the storage unit and transmits the PPD to the information processing apparatus 10 according to a communication protocol such as SNMP or the Bonjour.

The memory 53 is a ROM and a RAM, for example, and stores therein various computer programs and various types of data. The storage unit 52 is a HDD, a flash ROM, or a Universal Serial Bus (USB) memory, for example, and stores therein device information, various computer programs including the device controlling firmware, and various types of data including a PPD. As mentioned earlier, the device information includes, for example, paper information related to the configuration of paper feed trays included in the image processing apparatus 50, and to the paper size or the paper type of the paper placed in a paper feed tray, and option configuration information indicating whether any of the options mentioned above are added. The configuration of paper feed trays at least indicates the tray number of the paper feed tray to be used, for example. A PPD contains setting items that are set with configuration and function information related to image outputs. The setting items include, for example, those related to a paper feed tray included in the image processing apparatus 50, and those related to printing functions achieved by the image processing apparatus 50. The setting items related to a paper feed tray include, for example, a setting item for the paper size of paper placed in a paper feed tray, and a setting item for the tray number of the paper feed tray to be used. If the image processing apparatus 50 includes a plurality of paper feed trays, the former item is set with the paper size of the paper placed in each of the paper feed trays, and the latter item is set with the tray number of any one of the paper feed trays. The setting items related to printing functions include, for example, an item for setting whether aggregate printing is to be performed, an item for setting whether monochromatic or color printing is to be performed, and an item for setting whether duplex printing or simplex printing is to be performed. A PPD is either a PPD with each of the setting items set with a predetermined initial value (referred to as an "original PPD"), or a PPD having initial values in an original PPD modified and customized (referred to as a "customized PPD"). The storage unit may store therein an original PPD alone, or both of the original PPD and a customized PPD. In the description below, when an original PPD and a customized PPD do not need to be distinguished, a PPD is simply referred to as a PPD.

Each of the various functions realized by causing the CPU 51 in the image processing apparatus 50 with such a configuration to execute various computer programs will now be explained. The CPU 51 stores a customized PPD separately from an original PPD in the storage unit 52 by setting initial values to the respective setting items included in the original PPD based on operation inputs performed by a user with the operation panel 55. The CPU 51 also transmits device information stored in the storage unit 52 to the information processing apparatus 10 when the information processing apparatus 10 retrieves a printer to be registered over the network NT1. The CPU 51 also transmits a PPD reflecting the device information, using an original PPD or a customized PPD as a base PPD, to the information processing apparatus 10 in response to a request issued by the information processing apparatus 10. In addition, upon receiving the latest device controlling firmware from the information processing apparatus 10, the CPU 51 replaces the device controlling firmware stored in the storage unit 52 with the received device controlling firmware to update the device controlling firmware to the latest one. The CPU 51 executes the device controlling firmware to update the PPD stored in the storage unit 52.

Processes performed in the information processing system according to the embodiment will now be explained. To begin with, a process of obtaining a PPD performed by the information processing apparatus 10 will be explained with reference to FIG. 3. When registering a printer, the information processing apparatus 10 transmits a retrieval request message for retrieving a printer connected to the network NT1 according to a communication protocol such as SNMP and the Bonjour (Step S1). If the information processing apparatus 10 receives device information transmitted by a printer connected to the network NT1 in response to the retrieval request message, and discovers the printer connected to the network NT1 (YES at Step S2), the information processing apparatus 10 displays the printer ID of the printer in a list format as a candidate for registration on the display unit (Step S3). If the user viewing the display makes an operation input for selecting the printer ID of the printer to be registered with the operation input unit (YES at Step S4), the information processing apparatus 10 determines if the PPD associated with the printer ID for the selected printer to be registered is stored in the auxiliary storage. If the determination result is negative, the information processing apparatus 10 accesses the printer to be registered over the network NT1, and transmits a transmission request message to have the PPD transmitted (Step S5). The communication protocol used in transmitting the transmission request message is, for example, HTTP, HTTP Secure (HTTPS), File Transfer Protocol (FTP), or Simple Mail Transfer Protocol (SMTP). If the information processing apparatus 10 receives the PPD transmitted by the printer in response to the transmission request message (YES at Step S6), the information processing apparatus 10 stores the PPD in the auxiliary storage in association with the printer ID of the printer. At this time, the PPD reflects the device information of the printer and is customized by the user as required. A process of transmitting the PPD performed by the image processing apparatus 50 as the printer to be registered will be described later in detail. The information processing apparatus 10 then performs an installing process to install the PPD, and performs a printer registration process for the printer to be registered (Step S20).

On the contrary, if the information processing apparatus 10 cannot receive the PPD from the printer to be registered in response to the transmission request message (NO at Step S6), the information processing apparatus 10 accesses the manufacturer's Web server SV2 over the networks NT1 and NT2, and transmits a transmission request message requesting transmission of a PPD associated with the printer ID of the printer to be registered (Step S7). In this case as well, the communication protocol used in transmitting the transmission request message is, for example, HTTP, HTTPS, FTP, or SMTP. If the information processing apparatus 10 receives the PPD transmitted from the manufacturer's Web server SV2 in response to the transmission request message (YES at Step S8), the information processing apparatus 10 performs the process at Step S20. If the information processing apparatus 10 cannot receive the PPD from the manufacturer's Web server SV2 in response to the transmission request message (NO at Step S8), the information processing apparatus 10 transmits a transmission request message requesting transmission of the latest device controlling firmware containing the PPD associated with the printer ID of the printer to be registered to the manufacturer's Web server SV2 (Step S9). If the information processing apparatus 10 receives the latest device controlling firmware transmitted by the manufacturer's Web server SV2 in response to the transmission request message (YES at Step S10), the information processing apparatus 10 displays a message for asking the user whether the device controlling firmware should be updated to the latest one on the display unit (Step S11). If the user viewing the display makes an operation input to make the update to the latest device controlling firmware with the operation input unit (YES at Step S12), the information processing apparatus 10 transmits the latest device controlling firmware to the printer to be registered, and updates the device controlling firmware to the latest one (Step S13). A process of updating the device controlling firmware performed by the image processing apparatus 50 as the printer to be registered will be described later in detail. The system control then returns to Step S5, and the information processing apparatus 10 accesses the printer to be registered updated with the latest device controlling firmware, and transmits a transmission request message to have a PPD transmitted. The information processing apparatus 10 can then receive the PPD included in the latest device controlling firmware, reflecting the device information of the printer, and customized as appropriated from the printer to be registered at Step S6.

On the contrary, if the information processing apparatus 10 cannot receive the latest firmware from the manufacturer's Web server SV2 (NO at Step S10), the information processing apparatus 10 accesses the OS-related Web server SV1 over the networks NT1 and NT2, and transmits a transmission request message to request transmission of a PPD associated with the printer ID of the printer to be registered (Step S14). In this case as well, the communication protocol used in transmitting the transmission request message is, for example, HTTP, HTTPS, FTP, or SMTP. If the information processing apparatus 10 receives the PPD transmitted by the OS-related Web server SV1 in response to the transmission request message (YES at Step S15), the information processing apparatus 10 performs the process at Step S20. If the information processing apparatus 10 cannot receive the PPD from the OS-related Web server SV1 in response to the transmission request message (NO at Step S15), the information processing apparatus 10 displays a message indicating that no PPD was found on the display unit (Step S16), and performs an error process (Step S17). If the information processing apparatus 10 cannot receive any device information of a printer at Step S1, and cannot discover any printer connected to the network NT1 (NO at Step S2), the information processing apparatus 10 displays a message indicating as so on the display unit (Step S18), and performs an error process (Step S19).

Processes performed by the image processing apparatus 50 as the printer to be registered will now be explained. To begin with, a process performed by the image processing apparatus 50 upon receiving the retrieval request message from the information processing apparatus 10 at Step S1 illustrated in FIG. 3 will be explained with reference to FIG. 4. Upon receiving the retrieval request message (Step S30), the image processing apparatus 50 collects the device information in response to the retrieval request message (Step S31). For example, the image processing apparatus 50 collects the device information by detecting the configuration or the status of the paper feed tray included therein to generate the paper information, and by detecting the options added thereto to generate the option configuration information. The image processing apparatus 50 then transmits the collected device information to the information processing apparatus 10 (Step S32).

A process performed by the image processing apparatus 50 upon receiving the transmission request message transmitted by the information processing apparatus 10 at Step S5 illustrated in FIG. 3 will be explained with reference to FIG. 5. Upon receiving the transmission request message (Step S40), the image processing apparatus 50 determines if a customized PPD customized by the user is stored in the storage unit 52 in response to the transmission request message (Step S41). If a customized PPD is stored in the storage unit 52 (YES at Step S41), the image processing apparatus 50 uses the customized PPD as a base PPD (Step S42) to perform the process at Step S44. If no customized PPD is stored in the storage unit 52 (NO at Step S41), the image processing apparatus 50 uses the original PPD stored in the storage unit 52 as the base PPD (Step S43) to perform the process at Step S44. At Step S44, the image processing apparatus 50 performs a process of reflecting the device information to the base PPD.

Figure 6:
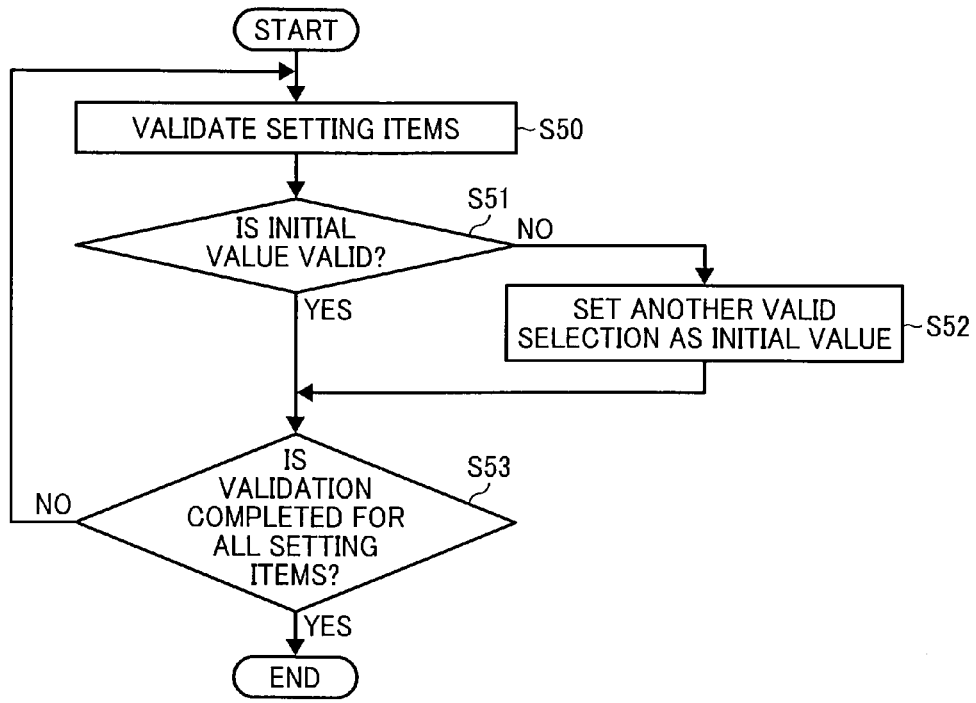
FIG. 6 is a flowchart of detailed processes of the process at Step S44 in FIG. 5.

FIG. 6 is a flowchart of detailed processes included in the process at Step S44. The image processing apparatus 50 validates if the initial value set in each of the setting items included in the base PPD matches the device information (Step S50), and determines if the initial values set in the setting items are valid. If the image processing apparatus 50 determines that the initial values set in the setting items are not valid (NO at Step S51), the image processing apparatus 50 refers to the device information, and sets a valid initial value to the corresponding setting item (Step S52). If this process is completed for all of the setting items (YES at Step S53), the system control goes to Step S44 illustrated in FIG. 5. If this process is not completed for all of the setting items (NO at Step S53), the system control goes to Step S50, and the image processing apparatus 50 performs the process for a different setting item.

More specifically, assuming that an initial value of "A4" size is set to the setting item for setting a paper size amongst the setting items included in the base PPD, the image processing apparatus 50 refers to the paper size specified in the paper information as device information to determine if there is any paper feed tray in which "A4" size paper is placed. If no "A4" size paper is placed in any paper feed tray, the image processing apparatus 50 determines that the initial value set in the setting item for the paper size specified in the PPD is not valid, and sets a usable paper size, for example "LT", to the setting item as an initial value for the paper size. If the image processing apparatus 50 includes a plurality of paper feed trays, a usable paper size may be the size of paper placed in any one of the paper feed trays, the size of paper placed in the paper feed tray with the largest amount of paper, or the size of paper placed in the paper feed tray selected by the user with the operation panel, for example. Assuming that an initial value of "tray 1" is set to the setting item for setting the tray number of the paper feed tray to be used amongst the setting items included in the PPD, the image processing apparatus 50 refers to the configuration of paper feed trays indicated in the paper information as device information. If other initial value than "tray 1" is set as the tray number of the paper feed tray to be used, the image processing apparatus 50 determines that the initial value set in the setting item is not valid, and sets the tray number of the paper feed tray to be used for the configuration of the paper feed trays indicated by the paper information as the initial value of the setting item included in the PPD. For the setting items not related to the device information included in the base PPD, for example, those related to printing functions, the image processing apparatus 50 can consider the initial value set in the setting item valid without validating whether the initial value matches the device information.

Returning to the explanation of FIG. 5, the image processing apparatus 50 transmits the base PPD reflecting the device information to the information processing apparatus 10 at Step S45. If the customized PPD is used as a base PPD at Step S43, the image processing apparatus 50 transmits the customized PPD reflecting the device information to the information processing apparatus 10 at Step S45.

Figure 7:
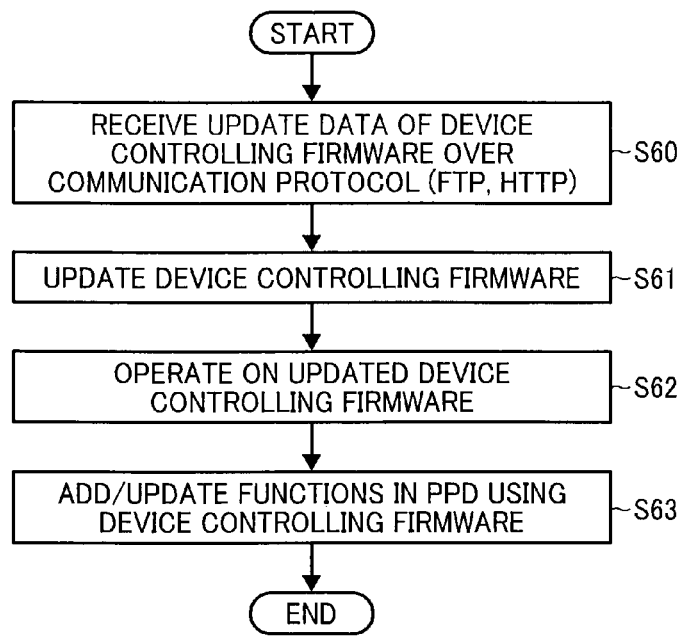
FIG. 7 is a flowchart of a process performed when the image processing apparatus receives device controlling firmware from the information processing apparatus at Step S13 in FIG. 3.

A process performed by the image processing apparatus 50 upon receiving the device controlling firmware from the information processing apparatus 10 at Step S13 illustrated in FIG. 3 will be explained with reference to FIG. 7. Upon receiving the device controlling firmware (Step S60), the image processing apparatus 50 replaces the device controlling firmware stored in the storage unit 52 with the received device controlling firmware to update to the latest device controlling firmware (Step S61). The image processing apparatus 50 then reads the device controlling firmware thus updated from the storage unit 52, and executes the device controlling firmware (Step S62). During the execution, the image processing apparatus 50 may be either rebooted or not rebooted. The image processing apparatus 50 updates the PPD stored in the storage unit 52 based on the device controlling firmware (Step S63). For example, if a new function is added to the device controlling firmware, the image processing apparatus 50 adds a setting item related to the function to the PPD.

Figure 8:
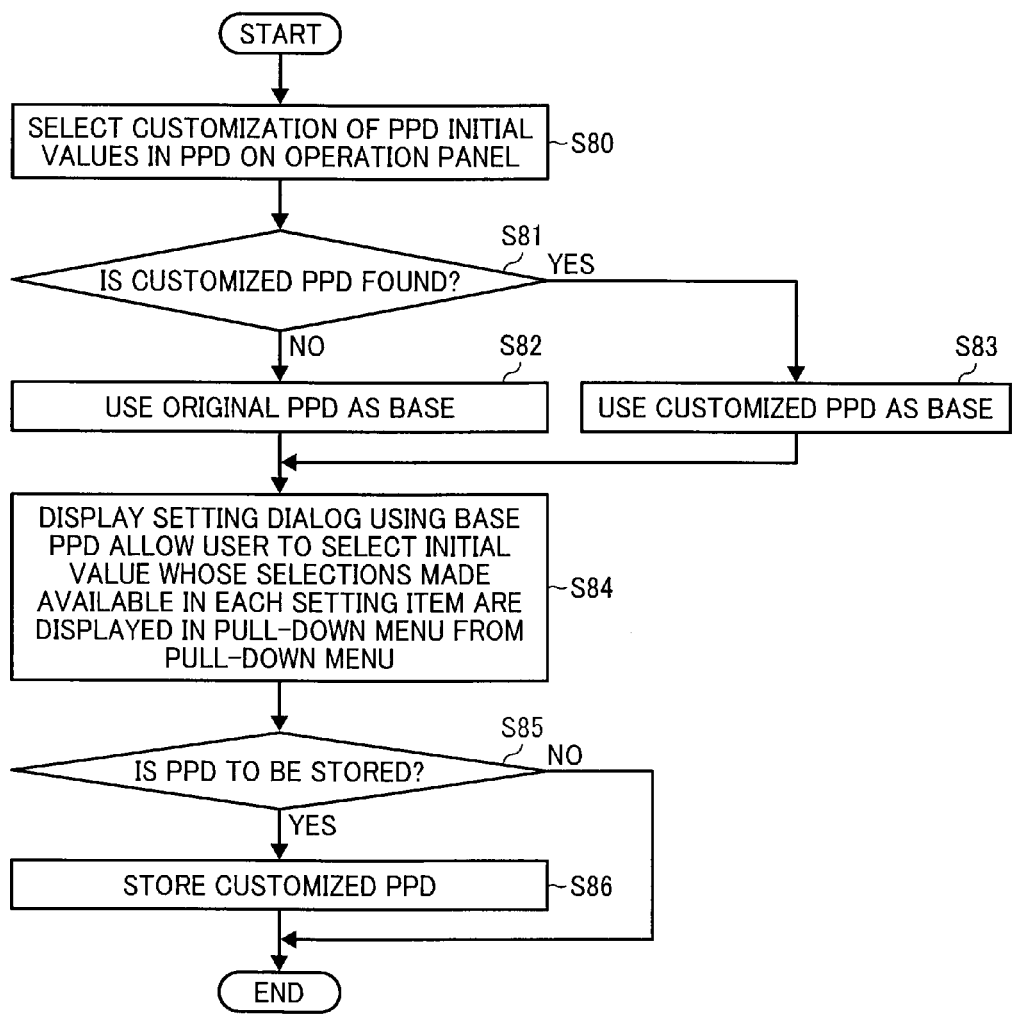
FIG. 8 is a flowchart of a process of customizing a PPD.

A process of customizing a PPD by causing the image processing apparatus 50 to set initial values to the PPD based on user operation inputs will be explained with reference to FIG. 8. When a user makes an operation input giving an instruction for starting customizing initial values set in the PPD with the operation panel 55, the image processing apparatus 50 receives the operation input (Step S80), and determines if a customized PPD is stored in the storage unit 52 (Step S81). If a customized PPD is stored in the storage unit 52 (YES at Step S81), the image processing apparatus 50 uses the customized PPD as a base PPD (Step S83) to perform the process at Step S84. If no customized PPD is stored in the storage unit 52 (NO at Step S81), the image processing apparatus 50 uses the original PPD stored in the storage unit 52 as a base PPD (Step S82) to perform the process at Step S84. At Step S84, the image processing apparatus 50 displays a setting dialog for setting initial values to the setting items included in the base PPD on the operation panel 55. In the setting dialog, amongst initial values available for setting, initial values that are permitted to be set are displayed as alternatives in a pull-down menu, for example, for each of the setting items. If the user makes operation inputs on the setting dialog with the operation panel 55 to select initial values that the user wants to set to each of the setting items, the image processing apparatus 50 receives the operation input, and displays a message asking the user whether the base PPD having the setting items set with the selected initial values should be stored on the operation panel 55. If the user viewing the message makes an operation input to store the base PPD with the operation panel 55, and the image processing apparatus 50 receives the operation input (YES at Step S85), the base PPD having the setting items set with the initial values selected by the user is stored in the storage unit 52 as a customized PPD (Step S86). If the storage unit already stores therein a customized PPD, the customized PPD is overwritten. If the storage unit 52 does not store therein any customized PPD and stores therein the original PPD alone, the base PPD having the setting items set with the initial values selected by the user is stored as a customized PPD separately from the original PPD. If the user does not make any operation input for storing the base PPD (NO at Step S85), or if the user makes no operation input of selecting the initial value that the user wants to set for any of the setting items, the image processing apparatus 50 ends the process.

Figure 9:
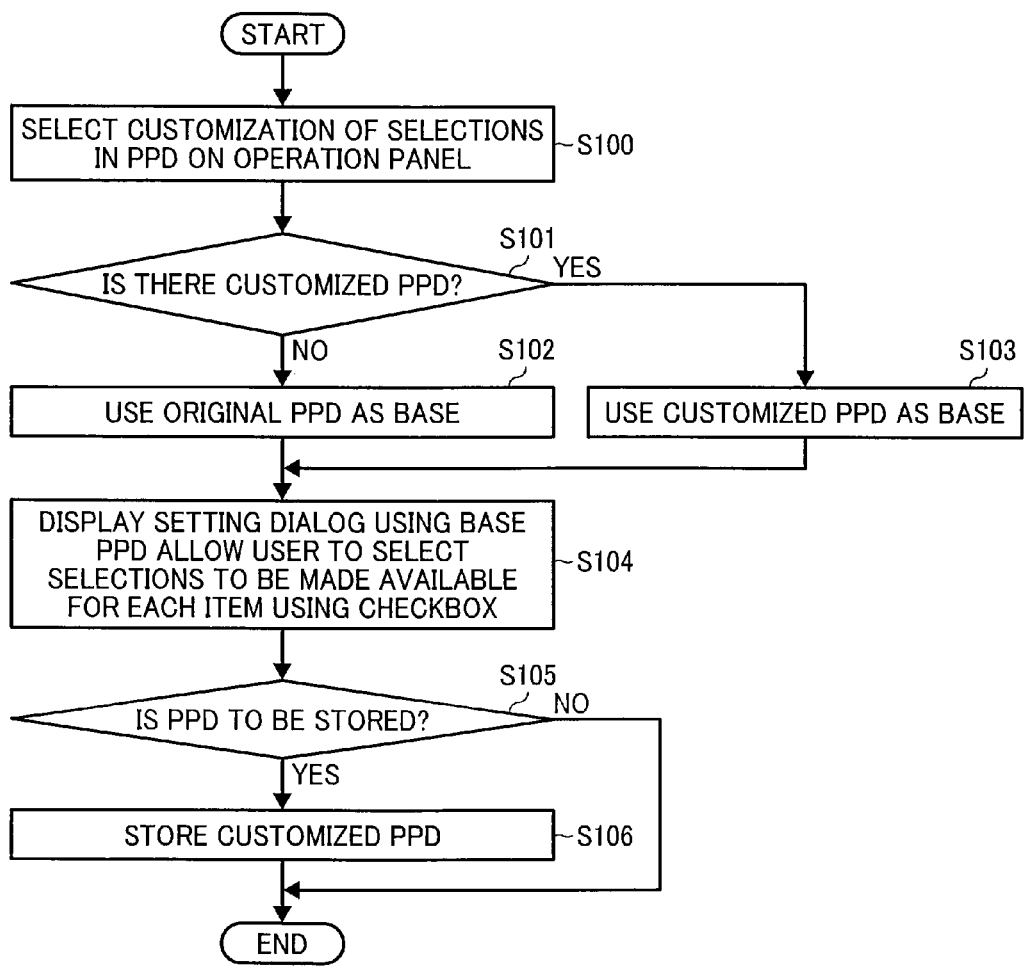
FIG. 9 is a flowchart of another process of customizing a PPD.

A process of customizing a PPD by selecting information for the setting items included in the PPD according to user operation inputs will now be explained with reference to FIG. 9. If a user makes an operation input giving an instruction for starting customization to select information to be made available for setting in the setting items included in the PPD with the operation panel 55, the image processing apparatus 50 receives the operation input (Step S100), and determines if any customized PPD is stored in the storage unit 52 (Step S101). If a customized PPD is stored (YES at Step S101), the image processing apparatus 50 uses the customized PPD as a base PPD (Step S103) to perform the process at S104. If no customized PPD is stored (NO at Step S101), the image processing apparatus 50 uses the original PPD stored in the storage unit 52 as a base PPD (Step S102) to perform the process at S104. At Step S104, the image processing apparatus 50 displays a setting dialog for selecting information to be made available for setting in each of the setting items included in the base PPD on the operation panel 55. In the setting dialog, a checkbox, for example, is displayed for every piece of information available for setting in each of the setting items included in the PPD. In the setting dialog, if the user makes operation inputs of checking the checkbox(es) corresponding to the information that the user wants to make available for setting in each of the setting items and removing checks from those corresponding to the information that the user does not want to make available for setting with the operation panel 55, the image processing apparatus 50 receives the operation inputs, and displays a message asking the user whether to store the base PPD including setting items whose information to be made available for setting is checked and selected by the user on the operation panel 55. If the user viewing the message makes an operation input to store the base PPD with the operation panel, the image processing apparatus 50 receives the operation input (YES at Step S105), and the base PPD including setting items whose information to be made available for setting is selected by the user is stored in the storage unit 52 as a customized PPD (Step S106). If a customized PPD is already stored in the storage unit 52, the customized PPD is overwritten. If no customized PPD is stored and the original PPD alone is stored in the storage unit 52, the base PPD including setting items having information made available for setting selected by the user is stored as a customized PPD separately from the original PPD. If the user makes no operation input for storing the base PPD (NO at Step S105), or if the user makes no operation input for selecting information to be made available for setting in any of the setting items, the image processing apparatus 50 ends the process.

For the setting items related to the printing functions amongst those included in a PPD, the user can make some operation inputs to select enabling aggregate printing, enabling duplex printing, and enabling monochromatic printing as information to be made available for setting, and make some operation inputs to exclude disabling aggregate printing, enabling simplex printing, and enabling color printing, for example. The image processing apparatus 50 can then customize the PPD based on the operation inputs. The information processing apparatus 10 receiving the PPD then can use a PPD permitting a user to enable aggregate printing, duplex printing, and monochromatic printing, without permitting the user to disable aggregate printing, and to enable simplex printing nor color printing. In this manner, use of printing functions accruing more running cost can be suppressed.

As described above, the image processing apparatus 50 stores therein a PPD, and transmits a PPD reflecting device information to the information processing apparatus 10 when the information processing apparatus 10 retrieves a candidate printer for registration over the network NT1, and makes a request for a PPD to an image processing apparatus 50 selected by the user as a printer to be registered amongst the printers found in the retrieval. In addition, the image processing apparatus 50 can customize a PPD based on user operation inputs, reflect device information on the customized PPD, and transmit the PPD to the information processing apparatus 10. With this configuration, the information processing apparatus 10 can obtain a PPD from the image processing apparatus 50 without establishing bidirectional communications with the image processing apparatus 50. Furthermore, because a PPD received from the image processing apparatus 50 is customized in the image processing apparatus 50 as required, the user does not have to perform any operation inputs on the information processing apparatus 10 to customize the PPD. Accordingly, the user can use the PPD received from the image processing apparatus 50 in a printer registration process and execute printing.

Furthermore, even if the information processing apparatus 10 may establish bidirectional communications with the image processing apparatus 50 when retrieving candidate printers for registration and receiving a PPD during a printer registration process, once the printer is registered, the information processing apparatus 10 can execute printing simply with unidirectional communications to transmit print data to the image processing apparatus 50. Therefore, communications required in executing printing can be simplified.

Furthermore, the image processing apparatus 50 is caused to customize initial values for the setting items related to printing functions amongst those included in a PPD in response to user operation inputs to enable aggregate printing, duplex printing, and monochromatic printing, for example. Therefore, the information processing apparatus 10 can obtain a PPD thus customized from the image processing apparatus 50, and use the PPD including the initial settings set to enable aggregate printing, duplex printing, and monochromatic printing. In this manner, printing accruing more running cost can be suppressed. Moreover, it is no longer necessary to prepare a special driver for providing settings for such printing functions. Therefore, costs of the information processing apparatus 10 can be reduced.

Furthermore, the information processing apparatus 10 accesses the manufacturer's Web server SV2, receives the latest device controlling firmware containing the PPD, and transmits the device controlling firmware to the image processing apparatus 50 to cause the image processing apparatus 50 to update the device controlling firmware. Therefore, the PPD can support functions of the latest device controlling firmware. For example, when functions of the device controlling firmware are extended, and if the PPD corresponding to such functions and the device controlling firmware are separately supplied to the image processing apparatus 50, a PPD not supporting the extended functions might be supplied in mistake. However, according to the embodiment, such a problem can be avoided.

Even in an environment where the network NT1 is a local area network, for example, and the information processing apparatus 10 lacks a function for establishing communications over a global network such as the Internet, the information processing apparatus 10 can obtain the PPD from the image processing apparatus 50, and execute printing.

Variations

The present invention is not limited to the embodiment as it is, and in an implementation stage, the present invention may be implemented with some components modified within the scope of the present invention without deviating from the sprit thereof. Furthermore, various aspects of the present invention may be achieved by appropriately combining a plurality of components disclosed in the embodiment. For example, some of the components disclosed in the embodiment may be omitted. Moreover, the components disclosed in different embodiments may be combined appropriately. In addition, various exemplary modifications explained below are also possible.

Various computer programs executed on the information processing apparatus 10 in the embodiment may be stored in a computer connected to a network such as the Internet, and made available for downloads over the network. The various computer programs may be made available as a file in an installable or an executable format in a manner recorded in a computer-readable recording medium such as a compact disk read-only memory (CD-ROM), a flexible disk (FD), a compact disk recordable (CD-R), or a digital versatile disk (DVD). The same can be said to various computer programs executed on the image processing apparatus 50.

In the embodiment described above, the image processing apparatus 50 is explained to include an image processing engine such as a single-drum color plotter, a four-drum color plotter, a scanner, or a facsimile unit. However, the present invention is not limited thereto, and the image processing apparatus 50 may be any type of image processing apparatuses as long as the image processing apparatuses outputs images, such as copying machines, printers, scanners, and facsimiles.

Figure 3A:
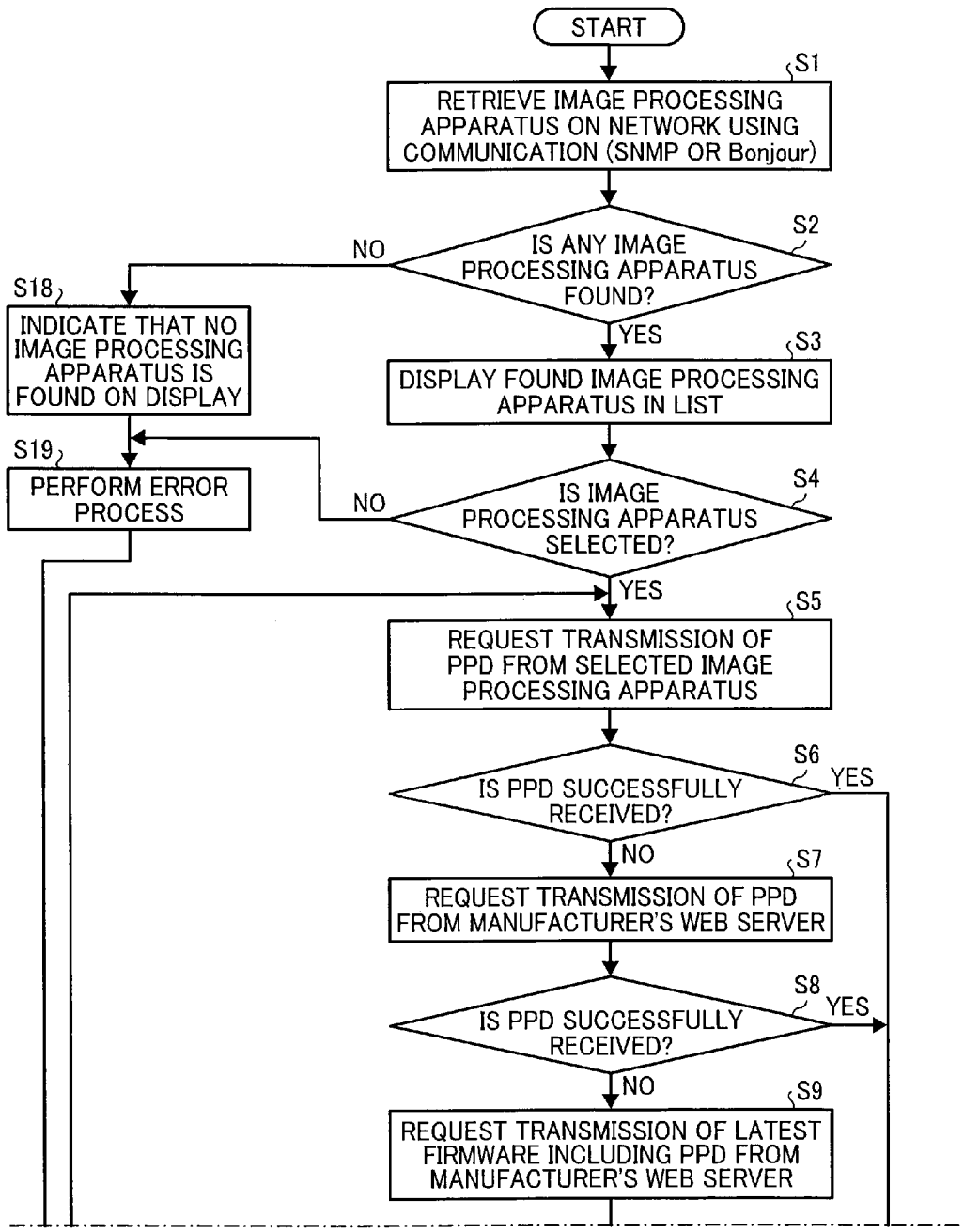
FIG. 3 is a flowchart of a PPD obtaining process performed by an information processing apparatus.
Figure 3B:
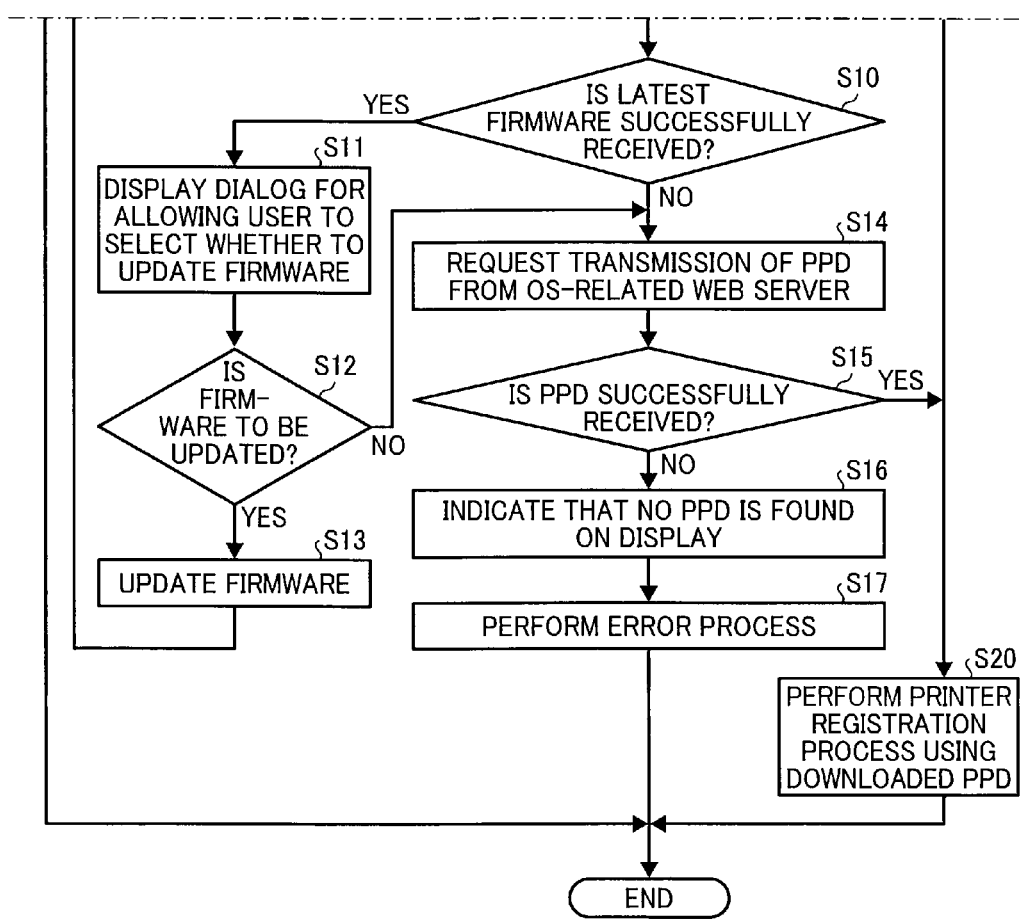

In the embodiment described above, the information processing apparatus 10 may also perform the process at Step S5 without determining if the auxiliary storage stores therein a PPD associated with a printer ID of the printer to be registered at Step S4 illustrated in FIG. 3.

In the embodiment described above, the information processing apparatus 10 may be caused to access the image processing apparatus 50 to download a PPD therefrom based on some operation inputs made by a user with the operation input unit. In such an example as well, the image processing apparatus 50 can transmit a PPD reflecting the device information of the image processing apparatus 50 and customized by a user as appropriate to the information processing apparatus 10.

In the embodiment described above, the information processing apparatus 10 performs the processes at Steps S9 to S13 illustrated in FIG. 3. However, the information processing apparatus 10 does not necessarily have to perform these processes. For example, the image processing apparatus 50 may perform these processes, and the image processing apparatus 50 may update the device controlling firmware stored in the storage unit to the latest device controlling firmware by replacing the device controlling firmware with the one received from the manufacturer's Web server SV2 at Step S13.

In the embodiment described above, the process of customizing a PPD is performed in response to operation inputs made by a user with the operation panel 55 on the image processing apparatus 50. However, the present invention is not limited thereto. For example, a user may cause the information processing apparatus 10 to access the image processing apparatus 50 via a browser over a communication protocol such as HTTP or HTTPS, and to display a setting dialog in a browser window on the display unit. When the user makes some operation inputs in the setting dialog with the operation input unit to select initial values for the setting items, the information processing apparatus 10 may be caused to transmit a setting request message requesting the image processing apparatus 50 to set the initial values to the setting items. In response to the setting request message, the image processing apparatus 50 is caused to store the PPD having the setting items set with the initial values as a customized PPD in the storage unit 52.

Alternatively, a user may make some operation inputs to cause the information processing apparatus 10 to transmit a setting designation message, for example, to the image processing apparatus 50 in order to designate information made available for setting at least one of setting items included in a PPD. In response to the setting designation message, the image processing apparatus 50 is caused to select the information thus designated as information made available for setting, and to store the PPD containing the setting item(s) as a customized PPD in the storage unit 52.

In the embodiment described above, the OS is explained to be Linux. However, the present invention is not limited thereto, and may be any other OS.

According to the present invention, the device information of the image processing apparatus can be reflected on a printer driver without requiring the user to make any operation inputs, or without establishing bidirectional communications with the image processing apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus that outputs images, the image processing apparatus comprising:
 a printer engine that forms the images;
 a storage unit that stores therein a first printer driver, in which configurations and functions related to image outputs are described in a text format, and stores therein device information including printing device information of the printer engine;
 a receiving unit that receives, from an information processing apparatus connected via a communication line, a transmission request message that requests transmission of the first printer driver;
 a user interface on the image processing apparatus which permits a user to customize the printing device information;
 a reflecting unit that reflects user-customized printing device information of the printer engine obtained from the user interface on the image processing apparatus into the first printer driver to generate a second printer driver forming a customized printer driver customized with the printing device information;
 a transmitting unit that transmits the customized printer driver to the printer engine; and a processor controlling at least one of the printer engine, the user interface, and the reflecting unit, which is programmed such that the image processing apparatus that outputs images executes the following conditional sequence, requests a target printer including said printer engine to be registered for a PostScript Printer Description PPD wherein the printer transmits to the information processing apparatus a customized PPD for the printer when the printer has the customized PPD, and transmits to the information processing apparatus an original PPD when the printer does not have a customized PPD, reflects collected device information on a received PPD and registers the PPD, upon not receiving the PPD, requests a Web server of the manufacturer of the target printer for the PPD;

upon not receiving the PPD from the Web server, requests the Web server for the latest version of main control firmware including a PPD for the target printer, updates, when receiving the PPD, the PPD with the latest version of main control firmware, reflects the collected device information on the received PPD and registers the PPD, and upon not receiving the main control firmware, further requests an operating system OS based Web server for the PPD for the target printer.

2. The image processing apparatus according to claim 1, wherein the storage unit stores therein the printing device information and at least one of the first printer driver in which predetermined initial values are set and the second printer driver in which the initial values set in the first printer driver are modified.

3. The image processing apparatus according to claim 2, wherein
when the storage unit stores therein the second printer driver, the reflecting unit reflects the printing device information on the second printer driver.

4. The image processing apparatus according to claim 3, wherein
the printing device information is included in the second printer driver by including at least one of a paper feed tray, a paper size of paper in the feed tray, or a tray number in the printing device information.

5. The image processing apparatus according to claim 4, further comprising:
a modifying unit that modifies initial values set in the first printer driver or the second printer driver based on a user operation input.

6. The image processing apparatus according to claim 5, wherein the user interface comprises an operation input receiving unit that receives the user operation input, and
wherein the modifying unit modifies the initial values set in the first printer driver or the second printer driver based on the user operation input received by the operation input receiving unit.

7. The image processing apparatus according to claim 5, wherein
the receiving unit receives a modification request message that is a message received from the information processing apparatus based on a user operation input and requests a modification of the initial values set in the first printer driver, and the modifying unit modifies the initial values set in the first printer driver or the second printer driver based on the modification request message received by the receiving unit.

8. The image processing apparatus according to claim 4, further comprising:
a selection unit that selects information that is to be made available for setting at least one of the setting items included in at least one of the first printer driver and the second printer driver based on a user operation input, wherein
the storage unit stores therein the second printer driver including the setting items having the information to be made available for setting selected by the selection unit.

9. The image processing apparatus according to claim 8, wherein the user interface comprises an operation input receiving unit that receives a user operation input, and
wherein the selection unit selects information that is to be made available for setting at least one of the setting items included in at least one of the first printer driver and the second printer driver based on an operation input received by the operation input receiving unit.

10. The image processing apparatus according to claim 8, wherein
the receiving unit receives a setting designating message that is a message transmitted by the information processing apparatus based on a user operation input, and designates information that is to be made available for setting at least one of the setting items included in at least one of the first printer driver and the second printer driver, and
the selection unit selects the information thus designated for the setting item as information that is to be made available for setting based on the setting designating message received by the receiving unit.

11. The image processing apparatus according to claim 1, wherein
the storage unit stores therein said main control firmware for controlling the image processing apparatus,
the receiving unit receives the firmware containing the first printer driver and being updated from the information processing apparatus, and
the image processing apparatus further comprises:
a storage control unit that stores the firmware received by the receiving unit in the storage unit; and
an updating unit that executes the firmware stored in the storage unit by the storage control unit to update to any of the printer drivers supporting functions realized by the firmware.

12. The image processing apparatus according to claim 1, wherein
the receiving unit receives print data giving an instruction for printing an image from the information processing apparatus, and
the image processing apparatus further comprises a printing unit that prints the image based on the print data.

13. An information processing apparatus comprising:
a transmitting unit that transmits a first transmission request message requesting transmission of a first printer driver in which configurations and functions related to image outputs performed in an image processing apparatus connected via a communication circuit are described in a text format, said image processing apparatus having a printer engine that forms images;
a user interface on the image processing apparatus which permits a user to customize the printing device information;

a receiving unit that receives the first printer driver and device information including printing device information of the printer engine indicating configurations selected by a user at the user interface, and in response to the first transmission request message, the receiving unit generates a second print driver forming a customized printer driver having been customized with the device information of the printer engine indicating the configurations selected by the user;

an installing unit that installs the customized printer driver; and a processor controlling at least one of the transmitting unit, the user interface, and the receiving unit, which is programmed to execute the following conditional sequence requests a target printer including said printer engine to be registered for a PostScript Printer Description PPD wherein the printer transmits to the receiving unit a customized PPD for the printer when the printer has the customized PPD, and transmits to the receiving unit an original PPD when the printer does not have a customized PPD, reflects collected device information on a received PPD and registers the PPD, upon not receiving the PPD, requests a Web server of the manufacturer of the target printer for the PPD;

upon not receiving the PPD from the Web server, requests the Web server for the latest version of main control firmware including a PPD for the target printer, updates, when receiving the PPD, the PPD with the latest version of main control firmware, reflects the collected device information on the received PPD and registers the PPD, and upon not receiving the main control firmware, further requests an operating system OS based Web server for the PPD for the target printer.

14. The information processing apparatus according to claim 13, wherein the transmitting unit transmits the first transmission request message to the image processing apparatus, and the receiving unit receives the first printer driver from the image processing apparatus in response to the first transmission request message.

15. The information processing apparatus according to claim 14, wherein when the receiving unit fails to receive the first printer driver from the image processing apparatus, the transmitting unit transmits the first transmission request message to the Web server managed by a manufacturer of the image processing apparatus, and the receiving unit receives the first printer driver from the server in response to the first transmission request message.

16. The information processing apparatus according to claim 15, wherein when the receiving unit fails to receive the first printer driver from the server, the transmitting unit transmits a second transmission request message requesting transmission of an update of the main control firmware for controlling the image processing apparatus to the server managed by the manufacturer of the image processing apparatus, the receiving unit receives the update of the main control firmware from the server in response to the second transmission request message, and the information processing apparatus further comprises an update control unit that transfers the update of the main control firmware received by the receiving unit to the image processing apparatus, and causes the image processing apparatus to update the firmware.

17. The information processing apparatus according to claim 16, wherein the transmitting unit transmits the first transmission request message to the image processing apparatus after the firmware is updated.

18. An information processing system in which an information processing apparatus and an image processing apparatus that outputs images are connected via a communication line, wherein the information processing apparatus comprises:

a first transmitting unit that transmits a first transmission request message requesting transmission of a first printer driver in which configurations and functions related to image outputs performed in the image processing apparatus are described in a text format;

a first receiving unit that receives in response to the first transmission request message the first printer driver and device information indicating configurations selected by a user related to image outputs performed in the image processing apparatus, and the image processing apparatus comprises:

a printer engine that forms the images;

a storage unit that stores therein the first printer driver and the device information including printing device information of the printer engine;

a second receiving unit that receives the first transmission request message from the information processing apparatus;

a user interface on the image processing apparatus which permits a user to customize the printing device information;

a reflecting unit that reflects the printing device information of the printer engine into the first printer driver to generate a second print driver forming a customized printer driver that is customized with the printing device information set by the user at the user interface;

a second transmitting unit that transmits the customized printer driver to the printer engine;

an installing unit that installs the customized printer driver; and a processor controlling at least one of the printer engine, the user interface, and the reflecting unit, which is programmed such that the image processing apparatus that outputs images executes the following conditional sequence requests a target printer including said printer engine to be registered for a PostScript Printer Description PPD wherein the printer transmits to the first receiving unit of the information processing apparatus a customized PPD for the printer when the printer has the customized PPD, and transmits to the first receiving unit of the information processing apparatus an original PPD when the printer does not have a customized PPD, reflects collected device information on a received PPD and registers the PPD, upon not receiving the PPD, requests a Web server of the manufacturer of the target printer for the PPD;

upon not receiving the PPD from the Web server, requests the Web server for the latest version of main control firmware including a PPD for the target printer, updates, when receiving the PPD, the PPD with the latest version of main control firmware, reflects the collected device information on the received PPD and registers the PPD, and upon not receiving the main control firmware, further requests an operating system OS based Web server for the PPD for the target printer.

\* \* \* \* \*